United States Patent
McGee, III

(10) Patent No.: US 8,756,391 B2
(45) Date of Patent: Jun. 17, 2014

(54) MULTI-LEVEL SECURITY COMPUTING SYSTEM

(75) Inventor: John F. McGee, III, Plano, TX (US)

(73) Assignee: Raytheon Company, Waltham, MA (US)

( * ) Notice: Subject to any disclaimer, the term of this patent is extended or adjusted under 35 U.S.C. 154(b) by 1335 days.

(21) Appl. No.: 12/545,610

(22) Filed: Aug. 21, 2009

(65) Prior Publication Data

US 2010/0299493 A1    Nov. 25, 2010

Related U.S. Application Data

(60) Provisional application No. 61/180,677, filed on May 22, 2009.

(51) Int. Cl.
*G06F 13/00* (2006.01)
*G06F 13/28* (2006.01)
*G06F 11/30* (2006.01)
*G06F 12/14* (2006.01)
*H01L 21/70* (2006.01)

(52) U.S. Cl.
USPC ............... 711/163; 711/154; 711/E12.091; 713/193; 257/499

(58) Field of Classification Search
None
See application file for complete search history.

(56) References Cited

U.S. PATENT DOCUMENTS

| | | | |
|---|---|---|---|
| 5,239,637 A | 8/1993 | Davis et al. | |
| 5,826,075 A | 10/1998 | Bealkowski et al. | |
| 5,987,605 A | 11/1999 | Hill et al. | |
| 6,457,126 B1 | 9/2002 | Nakamura et al. | |
| 6,704,933 B1 | 3/2004 | Tanaka et al. | |
| 7,076,667 B1 | 7/2006 | Gama et al. | |
| 7,237,145 B2 | 6/2007 | Sun et al. | |
| 7,451,366 B2 | 11/2008 | Youn et al. | |
| 7,512,852 B2 | 3/2009 | Bancel et al. | |
| 7,568,140 B2 | 7/2009 | Bancel et al. | |
| 7,577,886 B2 | 8/2009 | Bancel et al. | |
| 7,596,655 B2 | 9/2009 | Wang et al. | |
| 7,627,735 B2 | 12/2009 | Espasa et al. | |
| 7,650,602 B2 | 1/2010 | Amamiya et al. | |
| 7,652,922 B2 | 1/2010 | Kim et al. | |
| 2002/0166036 A1 | 11/2002 | Watts | |
| 2003/0212897 A1 | 11/2003 | Dickerson et al. | |
| 2004/0199779 A1 | 10/2004 | Huang | |
| 2004/0236508 A1 | 11/2004 | Ogasawara | |
| 2005/0273564 A1 | 12/2005 | Lakshmanamurthy et al. | |
| 2009/0089526 A1 | 4/2009 | Kuo et al. | |

FOREIGN PATENT DOCUMENTS

| WO | WO 01/46800 A2 | 6/2001 | ................ G06F 9/00 |
|---|---|---|---|
| WO | WO 2004/046925 A1 | 6/2004 | ................ G06F 9/46 |

OTHER PUBLICATIONS

PCT Notification of Transmittal of the International Search Report and the Written Opinion of the International Searching Authority, or the Declaration, mailed Aug. 24, 2010, with regard to International Application No. PCT/US 2010/035503 filed May 20, 2010.

*Primary Examiner* — Eric S Cardwell
(74) *Attorney, Agent, or Firm* — Schwegman, Lundberg & Woessner, P.A.

(57) ABSTRACT

According to one embodiment, a computing system includes two or more opto-electrical isolators coupling a corresponding two or more memory devices to a processor. Each memory device is electrically isolated from each other and configured to store data or instructions executed by the processor. Each opto-electrical isolator selectively couples its associated memory device to the processor such that only one of the two or more memory devices are writable by the processor at any instant of time.

21 Claims, 2 Drawing Sheets

MULTI-LEVEL SECURITY COMPUTING SYSTEM

RELATED APPLICATIONS

This application claims priority to U.S. Provisional Patent Application Ser. No. 61/180,677, entitled "MULTI-LEVEL SECURITY COMPUTING SYSTEM," which was filed on May 22, 2009.

TECHNICAL FIELD OF THE DISCLOSURE

This disclosure generally relates to computing systems, and more particularly, to a multi-level security computing system incorporating opto-electrical isolators and a method of operating the same.

BACKGROUND OF THE DISCLOSURE

Computing systems may incorporate various levels of security for protection of information that it processes from illicit use or access. Multi-level security is an aspect of computing system design in which differing processes may process information at differing security levels. Enterprise management of information may be accomplished by a multi-level security (MLS) architecture.

SUMMARY OF THE DISCLOSURE

According to one embodiment, a computing system includes two or more opto-electrical isolators coupling a corresponding two or more memory devices to a processor. Each memory device is electrically isolated from each other and configured to store data or instructions executed by the processor. Each opto-electrical isolator selectively couples its associated memory device to the processor such that only one of the two or more memory devices are writable by the processor at any instant of time.

Some embodiments of the disclosure may provide numerous technical advantages. For example, one embodiment of the computing system may provide isolation of memory devices storing data and/or instructions having a security level that differs from one another. Using this topology, the computing system may operate in a secure mode in which data and/or instructions stored in one memory device may be used while unclassified information stored in the other memory device remains isolated. For example, unclassified data and/or instructions stored in a particular memory device may include maintenance data and associated routines that operate on the maintenance data. The data and/or instructions on another memory device storing confidential information, therefore, may be isolated while maintenance procedures are performed.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

It should be understood at the outset that, although example implementations of embodiments are illustrated below, various embodiments may be implemented using any number of techniques, whether currently known or not. The present disclosure should in no way be limited to the example implementations, drawings, and techniques illustrated below. Additionally, the drawings are not necessarily drawn to scale.

A multi-level security (MLS) computing system usually incorporates a multi-tiered security scheme in which users have access to information based upon one or more authorization levels associated with each user. For example, enterprises, such as the government, utilize a multi-level security scheme that may include classified, secret, and top secret security levels. Implementation of multi-level security architectures have been developed for use on various types of computing systems. These computing systems, however, typically incorporate a relatively large amount software that requires a relatively long time to develop.

Figure 1:
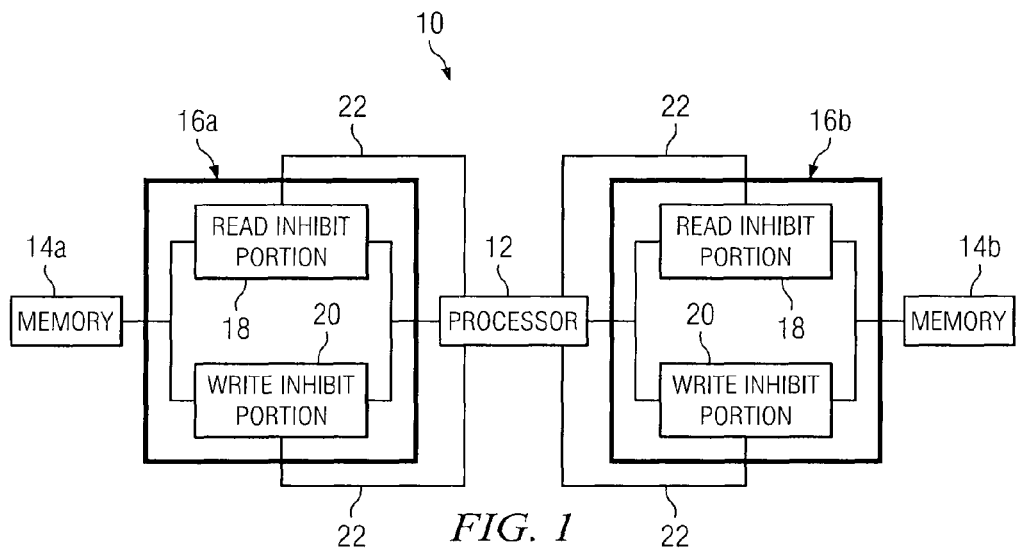
FIG. 1 shows one embodiment of a computing system according to the teachings of the present disclosure that may be used to implement a multi-level security architecture.

FIG. 1 shows one embodiment of a computing system 10 according to the teachings of the present disclosure that may be used to implement a multi-level security architecture. Computing system 10 includes a processor 12 and two or more memory devices 14a and 14b that are each coupled to processor 12 through corresponding opto-electrical isolators 16a and 16b. Each opto-electrical isolator 16a and 16b includes a read inhibit portion 18 that selectively inhibits read access from its associated memory device 14a and 14b, and a write inhibit portion 20 that selectively inhibits write access to its associated memory device 14a and 14b. Memory devices 14a and 14b are electrically isolated from each other and coupled to processor 12 only through their associated opto-electrical isolators 16a and 16b such that data and instructions stored on memory devices 14a and 14b may be isolated from one another.

Control of read inhibit portion 18 and write inhibit portion 20 may be provided by control lines 22. In the particular embodiment shown, control lines 22 are coupled to processor 12 for control by the processor 12. In other embodiments, control lines 22 may be coupled to any suitable source for controlling the read inhibit portion 18 and write inhibit portion 20 of opto-electrical isolators 16a and 16b.

Opto-electrical isolators 16a and 16b facilitate movement of data and/or instructions between processor 12 and its associated memory device 14a and 14b while maintaining electrical isolation between the two. In this manner, data and/or instructions stored in one memory device 14a or 14b may be sufficiently isolated from the other memory device 14a or 14b, which may store data and/or instructions at a differing security level. Thus, opto-electrical isolators 16a and 16b may provide a multi-level security computing system with a relatively high degree of isolation of data and/or instructions that are classified according to differing security levels.

Each opto-electrical isolator 16a or 16b may include any suitable optical transducing elements, such as a light emitting diode (LED) in optical communication with a light sensing device, such as a photo sensitive diode. In one embodiment, each read inhibit portion 18 and write inhibit portion 20 includes a light generating device that is optically coupled to a light sensing device, such as a positive intrinsic negative (PIN) diode. A signal present at the light generating device causes it to generate light that is detected by the light sensing device that subsequently converts the light back into an electrical signal. Signals received through control lines 22 may be used to selectively disable operation of the light generating device or the light sensing device. Thus, movement of data or instructions may be selectively disabled between processor 12 and memory devices 14a and 14b according to signals present on control lines 22. The light generating device may be any type that generates light, such as a light emitting diode, a laser device, and incandescent bulb, or other suitable device.

Processor 12 may be any device that processes data and/or instructions stored in memory devices 14a and 14b. For example, processor 12 may include a microprocessor, a field programmable gate array (FPGA), an application specific integrated circuit (ASIC), or any combination of the preceding implemented on one or more integrated circuit (IC) chips.

Memory devices 14a and 14b may include any computer memory element that stores data and/or executable instructions. Examples of suitable memory elements include random access memory (RAM), read only memory (ROM), mass storage media (for example, a hard disk), removable storage media (for example, a Compact Disk (CD) or a Digital Video Disk (DVD)), database and/or network storage (for example, a server), and/or other computer-readable medium.

In one embodiment, memory device 14a stores data and/or instructions at a security level that differs from the security level of data and/or instructions stored in memory device 14b. As an example in which computing system 10 may be implemented in a multi-level security architecture, memory device 14a may store data and/or instructions having an unclassified security level while memory device 14b stores data and/or instructions having a classified security level. Thus, opto-electrical isolators 16a and 16b may be used to ensure data processor 12 is inhibited from accessing data and/or instructions from memory device 14b while operating in an unclassified mode via use of data and/or instructions from memory device 14a.

Opto-electrical isolators 16a and 16b may be controlled in any suitable manner. In one embodiment, opto-electrical isolators 16a and 16b may be controlled by instructions that execute processor 12 to alternatively allow access to memory devices 14a or 14b. In another embodiment, processor 12 may control opto-electrical isolators 16a and 16b according to specified conditions present on computing system 10 during its bootstrapping operation. In another embodiment, opto-electrical isolators 16a' and 16b' may be controlled by an external controlling system such as a manual switch that may be manually toggled by a user to alternatively select use of information stored in either memory device 14a' or 14b'.

Figure 2:
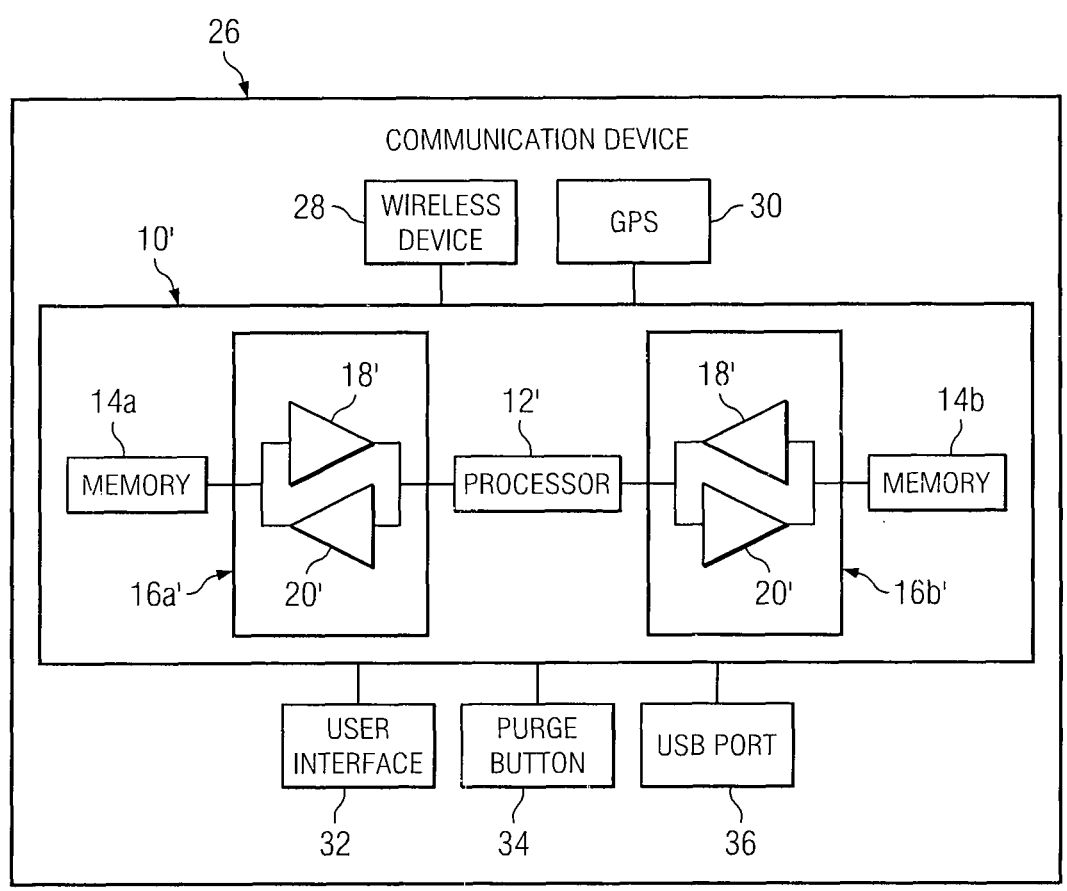
FIG. 2 is a diagram showing another embodiment of a computing system according to the teachings of the present disclosure that may be configured in a communication device.

FIG. 2 is a diagram showing another embodiment of a computing system 10' according to the teachings of the present disclosure that may be configured in a communication device 26. Communication device 26 includes a computing system 10' coupled to a wireless transceiver 28, a global positioning system 30, a purge button 34, a user interface 32, and a universal serial bus (USB) port 36 as shown. Computing system 10' has a processor 12', two or more memory devices 14a' and 14b', and two or more opto-electrical isolators 16a' and 16b' that are similar in design and construction to the computing system 10 of FIG. 1.

Wireless transceiver 28 transmits and receives wireless radio signals from other remotely configured wireless transceivers. In one embodiment, wireless transceiver 28 may include a rifleman radio that is commonly used by military ground personnel. In other embodiments, wireless transceiver 28 may be any wireless transceiving device that may receive or send information to or from communication device 26.

User interface 32 includes any suitable human interactive mechanism for receiving information from or inputting information for transmission through wireless transceiver or configuration of communication device 26. For example, user interface 32 may include a headset having earphones and a microphone for receiving or transmitting audible signals through wireless transceiver 28. As another example, user interface 32 may include other suitable mechanisms, such as a push-to-talk button, or a hands-free display for providing visual information to its user.

Global positioning system 36 may be included to provide the instantaneous geographical coordinates of communication device 26. In one embodiment, global positioning system 30 may include an enhanced position location reporting system (EPLRS) that transmits instantaneous coordinates of communication device 26 to a remotely configured wireless receiver.

Communication device 26 as shown may be useful for military purposes where certain military personnel may use communication device 26 according to their assigned security level. For example, military combatants having a classified security level may use communication device 26 by configuring computing system 10' to use memory 14b', which in this example stores data and instructions at the classified security level. Maintenance personnel, on the other hand, may service communication device 26 by configuring computing system 10' to use memory 14a' that may store data and/or instructions at an unclassified security level. The classified security level may be referred to, in this disclosure, as a system high level, and the unclassified security level may be referred to as a system low level.

Communication device 26 may function at a system high level in which computing system 10' is actively accessing data and instructions from memory 14b' that is classified at a classified security level. In this particular mode of operation, processor 12' is actively processing data and instructions from memory device 14b' and thus operating with a level of security with greater confidentiality than data stored in memory device 14a', which may be operating at an unclassified security level. To ensure security of classified data and/or instructions stored in memory device 14b', the write inhibit portion 20' of opto-electrical isolator 16a' inhibits write access to memory device 14a' such that no secure data from memory device 14b' is inadvertently stored in memory device 14a'. The read inhibit portion 18 of opto-electrical isolator 16a', however, may be allowed.

Communication device 26 may also function at a system low level in which computing system 10' is actively processing data and/or instructions from memory 14a', which in this particular embodiment is classified at an unclassified level. In this mode of operation, the read inhibit portion 18' and write inhibit portion 20' of opto-electrical isolator 16b' inhibits write access and read access of processor 12' from memory device 14b'. Thus, while processor 12' is processing generally unclassified data and instructions from memory device 14a', classified data and/or instructions stored in memory device 14b' may be isolated from inadvertent access to information and/or corruption of its information by processor 12' that is operating in an unclassified mode.

Figure 3:
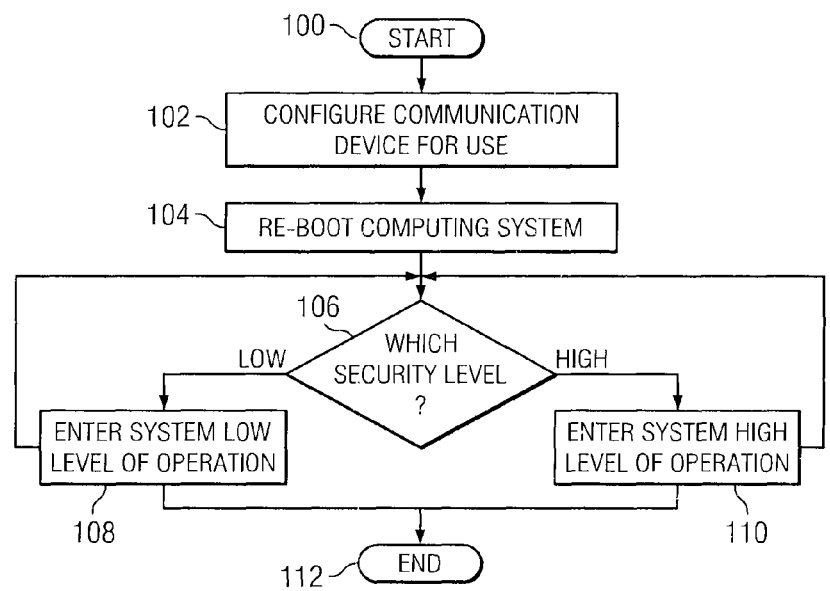
FIG. 3 is a flowchart showing one embodiment of a series of actions that may be performed by the communication device of FIG. 2.

FIG. 3 is a flowchart showing one embodiment of a series of actions that may be performed by the communication device 26 of FIG. 2. In act 100, the process is initiated.

In act 102, communication device 26 is configured for use. Configuration of communication device 26 may include any suitable procedure. Examples of suitable procedures include tuning of wireless radio and/or global positioning system, repair of any one or more elements of communication device 26, and/or firmware modifications.

In act 104, computing system 10' of communication device is rebooted. Rebooting of computing system 10' may be accomplished using any approach. In one embodiment, computing system 10' may be rebooted locally by actuating a particular button or a sequence of buttons configured on user interface 32. In another embodiment, computing system 10' may be rebooted remotely according to one or more signals received through wireless device 28.

In act 106, computing system 10' determines which security level to operate at. In one embodiment, computing system 10' initially enters the system low level in which processor 12' only accesses data and/or instructions from memory device 14a' as described in act 108. In other embodiments, computing system 10' may initially enter the system high level in response to one or more input conditions present during its boot strapping operation. For example, one input condition may include a key card, such as a system access module (SAM), a radio-frequency (RF) key card, or other similar type dongle inserted in USB port 36 during the boot strapping operation. Processor 12' may detect the presence of the key card, and upon successful entry of a password, enter the system high level in which processor 12' accesses data and/or instructions from memory device 14b' as described in act 110.

In one embodiment, computing system 10' enters the system high level by processor 12' executing a login file stored in memory device 14a' while in the system low level of operation. The login file generally includes a sequence of instructions that may include a login procedure for use by the user. For example, the login file may access information stored in the key card as described above and using this information, prompt for and receive a password from the user via user interface 32. Upon a successful login, computing system 10' may then enter the system high level as described with reference to act 110. In one embodiment, the login file is encrypted such that users operating computing system 10' at the system low level may be stopped from deciphering specified instructions that may be used to gain illicit access to memory device 14b'.

In act 108, computing system 10' of communication device 26 enters the system low level of operation, which in this particular embodiment is an unclassified level. In the system low level of operation, computing system 10' processes data and/or instructions from memory 14a'. Computing system 10' enters the system low level of operation by inhibiting read access and write access using the read inhibit portion 18' and write inhibit portion 20' of opto-electrical isolator 16b', respectively. Thus, processor 12' may only access memory device 14a' while operating at the system low level of operation.

Communication device 26 may operate in system low level in which memory 14a' includes data and/or instructions that may be useful for various operations, such as maintenance operations, repair operations or other operations that do not require operation at the system high level. While in this mode, the write inhibit portion 20' and read inhibit portion 18' of opto-electrical isolator 16b' is active to protect any data and/or instructions stored in memory 14b' from illicit access and/or modification.

Communication device 26 continues to operate throughout its duration at the system low level. The system low level of operation may be terminated by entering the system high level of operation at act 106 or terminating operation of the communication device 26 at act 112.

In act 110, computing system 10' of communication device 26 enters the system high level of operation, which in one embodiment may be a classified security level. In the system high level of operation, computing system 10' processes data and/or instructions from memory 14b'. In one embodiment, computing system 10' enters the system high level of operation by first inhibiting write access to memory device 14a' using write inhibit portion 20' of opto-electrical isolator 16a'. In this manner, data and/or instructions used in the system high mode may not be inadvertently stored in memory device 14a'. Next, read access and write access to memory device 14b' may be provided through the read inhibit portion 18' and write inhibit portion 20' of opto-electrical isolator 16b', respectively.

Communication device 26 continues to operate throughout its duration at the system high level. The system high level of operation may be terminated by entering the system low level of operation at act 106 or terminating operation of the communication device 26 at act 112. Communication device 26 may be optionally reverted back to system low level at any time during its operation. For example, it may become desirous to cease operation at the system high level if further use of communication device 26 may risk the integrity of data and/or instructions stored in memory device 14b' or illicit communications through wireless transceiver 28. For cases such as these, it may be beneficial to protect data and/or instructions stored in memory device 14b'.

In one embodiment, purge button 34 may be implemented to purge or erase the data and/or instructions stored in memory device 14b' upon its actuation. In another embodiment, the data and/or instructions stored in memory device 14b' may be purged remotely from one or more signals received through wireless transceiver 28. For example, a communication device 26 used by a military combatant who has become incapacitated may cause a security breech if recovered by an enemy user. Thus, in this case, processor 12' may be configured to purge the data and/or instructions stored in memory device 14b' by zeroing all of its memory and reset computing system 10' in response to a specific signal or sequence of signals received through wireless transceiver 28. When computing system 10' performs its boot strapping operation, it may then be directed to enter the system low level in which the data and/or instructions from memory device 14a' are used.

In act 110, the process ends.

Modifications, additions, or omissions may be made to computing system 10 without departing from the scope of the disclosure. The components of computing system 10 may be integrated or separated. For example, instructions used for boot strapping processor 12 may be stored in memory device 14a, memory 14b or in another separate memory circuit. Additionally, operations of opto-electrical isolators 16a and 16b may be controlled using any suitable logic comprising software, hardware, and/or other logic.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A computer-implemented system comprising:
  two or more opto-electrical isolators that couple a corresponding two or more memory devices to a processor, a first of the two or more opto-electrical isolator being disposed between a first of the two or more memory devices and the processor and a second of the two or more opto-electrical isolator being disposed between a second of the two or more memory devices and the processor, the first and second of the two or more memory devices separated by the first and second of the two or more opto-electrical isolators and the processor, the two or more opto-electrical isolators, two or more memory devices, and processor configured in a communication device, each memory device being electrically isolated from each other and operable to store data or instructions executed by the processor, a first memory device of the two or more memory devices has a security level that is more confidential than the security level of a second memory device of the two or more memory devices;

the opto-electrical isolator associated with the first memory device operable to:
  inhibit read and write access of the first memory device when the processor accesses the second memory device; and
the opto-electrical isolator associated with the second memory device operable to:
  inhibit write access of the second memory device when the processor accesses the first memory device.

2. A computer-implemented system comprising:
two or more opto-electrical isolators that couple a corresponding two or more memory devices to a processor, a first of the two or more opto-electrical isolator being disposed between a first of the two or more memory devices and the processor and a second of the two or more opto-electrical isolator being disposed between a second of the two or more memory devices and the processor, the first and second of the two or more memory devices separated by the first and second of the two or more opto-electrical isolators and the processor, each memory device being electrically isolated from each other and operable to store data or instructions executed by the processor, each opto-electrical isolator operable to:
  selectively couple its associated each memory device to the processor such that only one of the two or more memory devices are writable by the processor at any instant of time.

3. The computer-implemented system of claim 2, wherein each opto-electrical isolator comprises a read inhibit portion that is operable to selectively inhibit read access from its associated memory device and a write inhibit portion that is operable to selectively inhibit write access to its associated memory device.

4. The computer-implemented system of claim 2, wherein a first memory device of the two or more memory devices has a security level that is less confidential than the security level of a second memory device of the two or more memory devices, the opto-electrical isolator associated with the first memory device operable to inhibit write access of the first memory device when the processor accesses the second memory device, the opto-electrical isolator associated with the second memory device operable to inhibit read access and write access of the second memory device when the processor accesses the first memory device.

5. The computer-implemented system of claim 2, wherein the processor, the two or more memory devices and associated opto-electrical isolators are configured in a communication device.

6. The computer-implemented system of claim 2, wherein each opto-electrical isolator is controlled by the processor.

7. The computer-implemented system of claim 2, further comprising a key card coupled to the processor, a first memory device of the two or more memory devices has a security level that is less confidential than the security level of a second memory device of the two or more memory devices, the processor operable to selectively couple to the second memory by execution of a login file stored in the key card.

8. The computer-implemented system of claim 2, wherein each opto-electrical isolator is controlled by a controlling system external to the processor.

9. The computer-implemented system of claim 2, wherein the processor is operable to purge, using one or both of the opto-electrical isolators, the data or instructions in one or both of the two memory devices.

10. The computer-implemented system of claim 9, wherein the processor is coupled to a wireless transceiver, the processor operable to purge the data or instructions in response to one or more remote signals received from the wireless transceiver.

11. The computer-implemented system of claim 2, wherein the processor is operable to encrypt data or instructions that are written to one or both of the memory devices and decrypt data or instructions that are read from the one or both memory devices.

12. A computer-implemented method comprising:
selectively coupling two or more memory devices to a processor using a corresponding two or more opto-electrical isolators, a first of the two or more opto-electrical isolator being disposed between a first of the two or more memory devices and the processor and a second of the two or more opto-electrical isolator being disposed between a second of the two or more memory devices and the processor, the first and second of the two or more memory devices separated by the first and second of the two or more opto-electrical isolators and the processor such that only one of the two or more memory devices are writable by the processor at any instant of time, the two or more memory devices electrically isolated from each other and operable to store data or instructions that are executed on the processor.

13. The computer-implemented method of claim 12, further comprising:
selectively inhibiting read access, using a read inhibit portion of one opto-electrical isolator, from its associated memory device; and
selectively inhibiting write access, using a write inhibit portion of the one opto-electrical isolator, from its associated memory device.

14. The computer-implemented method of claim 12, further comprising:
inhibiting, using a first opto-electrical isolator, read access and write access of a first memory device associated with the first opto-electrical isolator, when the processor has read access and write access to a second memory device through a second opto-electrical isolator associated with the second memory device, the first memory device having a security level that is more confidential than the security level of the second memory device; and
inhibiting, using the second opto-electrical isolator, write access of the second memory device when the processor has read access and write access to the first memory device through the first opto-electrical isolator.

15. The computer-implemented method of claim 12, wherein the processor, the two or more memory devices and associated opto-electrical isolators are configured in a communication device.

16. The computer-implemented method of claim 12, further comprising controlling the two or more opto-electrical isolators using the processor.

17. The computer-implemented method of claim 12, further comprising selectively coupling to a second memory of the two or more memory devices by executing a login file store in a key card coupled to the processor, the second memory device of the two or more memory devices has a security level that is more confidential than the security level of a first memory device of the two or more memory devices.

18. The computer-implemented method of claim 12, further comprising controlling the two or more opto-electrical isolators using a controlling system external to the processor.

19. The computer-implemented method of claim 12, further comprising purging, using one or both of the opto-electrical isolators, the data or instructions in one or both of the two memory devices.

20. The computer-implemented method of claim 19, further comprising purging the data or instructions using one or more remote signals received from a wireless transceiver, the wireless transceiver coupled to the processor.

21. The computer-implemented method of claim 12, further comprising:
  encrypting the data or instructions that are written to the one or both of the memory devices; and
  decrypting the data or instructions that are read from the one or both memory devices.

\* \* \* \* \*

UNITED STATES PATENT AND TRADEMARK OFFICE
CERTIFICATE OF CORRECTION

Page 1 of 1

PATENT NO. : 8,756,391 B2
APPLICATION NO. : 12/545610
DATED : June 17, 2014
INVENTOR(S) : John F. McGee, III It is certified that error appears in the above-identified patent and that said Letters Patent is hereby corrected as shown below:

In the Specification,

In column 3, line 49, delete "bootstrapping" and insert --boot strapping--, therefor In column 4, line 16, delete "36" and insert --30--, therefor In column 4, line 28, after "memory", insert --device--, therefor In column 4, line 32, after "memory", insert --device--, therefor In column 4, line 39, after "memory", insert --device--, therefor In column 4, line 50, delete "18" and insert --18'--, therefor In column 4, line 54, after "memory", insert --device--, therefor In column 5, line 14, delete "device" and insert --transceiver--, therefor In column 5, line 49, after "memory", insert --device--, therefor In column 5, line 57, after "memory", insert --device--, therefor In column 5, line 63, after "memory", insert --device--, therefor In column 6, line 7, after "memory", insert --device--, therefor In column 6, line 53, after "memory", insert --device--, therefor Signed and Sealed this
Twenty-fifth Day of November, 2014

Michelle K. Lee
*Deputy Director of the United States Patent and Trademark Office*